April 22, 1930.                    C. GANT                    1,755,952
                          DEMONSTRATION DEVICE
                          Filed June 11, 1928        2 Sheets-Sheet 1
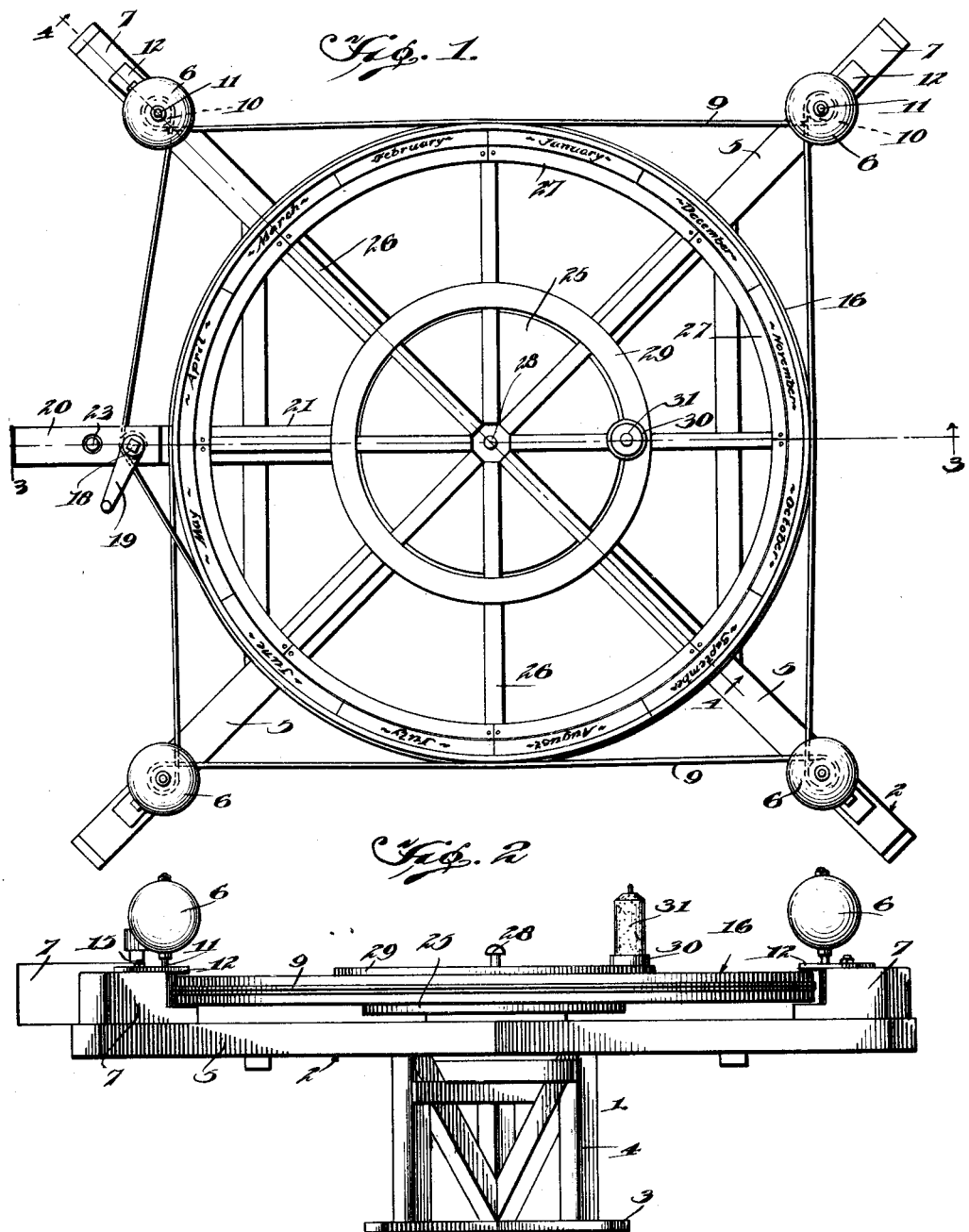
INVENTOR
CHARLIE GANT
BY
ATTORNEY April 22, 1930.                    C. GANT                    1,755,952
                            DEMONSTRATION DEVICE
                            Filed June 11, 1928          2 Sheets-Sheet 2
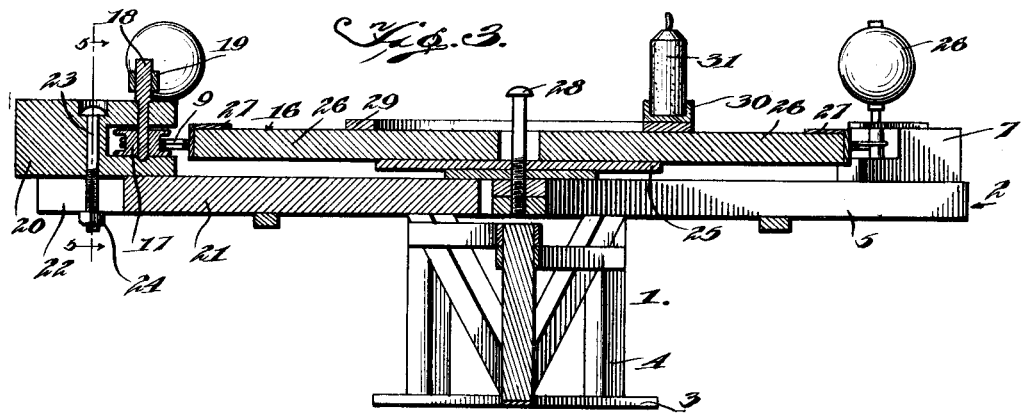
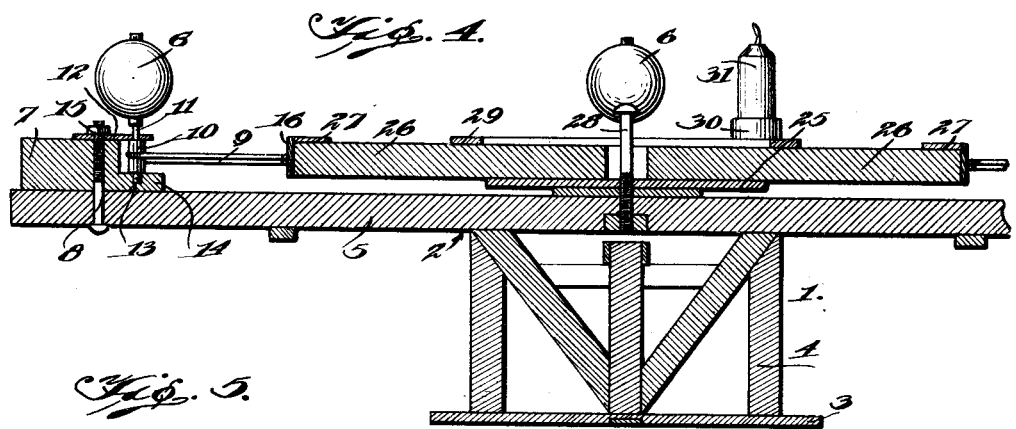
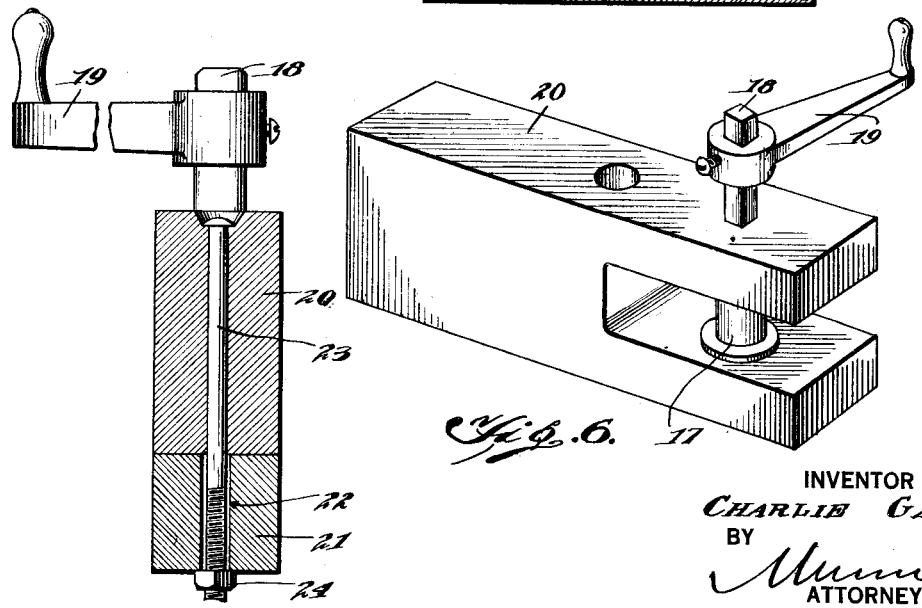
INVENTOR
*Charlie Gant,*
BY
*Attorney*

Patented Apr. 22, 1930

1,755,952

UNITED STATES PATENT OFFICE

CHARLIE GANT, OF AKRON, ALABAMA

DEMONSTRATION DEVICE

Application filed June 11, 1928. Serial No. 284,637.

This invention relates to improvements in educational apparatus, and it consists of the constructions, combinations and arrangements herein described and claimed.

An object of the invention is to provide a device for symbolically representing certain allegorical passages of the Bible which are descriptive of the views and visions of certain ones of the prophets.

Another object of the invention is to provide a device for demonstrating certain Biblical descriptions, the primary purpose being to use the device in Sunday school, church and similar assemblies.

Other objects and advantages appear in the following specification, reference being had to the accompanying drawings in which, Figure 1 is a plan view of the device, Figure 2 is a side elevation, Figure 3 is a cross section taken on the line 3—3 of Figure 1, Figure 4 is a detail cross section taken on the line 4—4 of Figure 1, Figure 5 is a detail cross section taken on the line 5—5 of Figure 3, Figure 6 is a detail perspective view of the crank bracket and its carried parts.

Usually there are times in the experience of every public speaker when the need of a visual demonstration of some portion or all of a subject is felt necessary not only to stimulate interest but to impress certain facts upon the mind of the audience. Nowhere is the need for demonstration devices of various sorts so persistent as in Sunday schools, churches and the like, for speakers in such assemblies must either be able to expound the Bible with exceptional clearness in order to hold the interest of their listeners, or must resort to a device such as mentioned in order to stimulate interest.

It is one of the purposes of the invention to provide a mechanical contrivance which is capable of being set up before an audience and operated by the speaker as he delivers his address. The particular subject or subjects which the device can be used for to demonstrate are those Biblical passages that are of the following import: That the earth moves relatively to the sun (Joshua 10:12-14), that the earth has foundations (Job 38:4), that certain visionary creatures did work that was as it were a wheel in the middle of a wheel (Ezekiel 1:15-16), and that there were four corners of the earth where the four winds were held (Rev. 7:1).

Reference is made to the drawings. A base, generally designated 1, provides a foundation by which a framework 2 and its appurtenances is supported. The foundation includes base bars 3 and a number of suitably braced uprights 4. It is upon the latter that the framework 2 may be set when required, any suitable fastening means (not shown) being employed to hold the base and the framework together should the occasion demand the tilting of the device.

The framework comprises crossed pieces 5 which are disposed at right angles to each other in order to provide points of support at the four corners of an imaginary square at which spheres 6 each representing the earth are located. While it is true that Rev. 7:1 refers to the earth in the singular term in the phrase "the four corners of the earth" it is practically impossible to make any physical demonstration of this passage other than to quadruplicate the earth member in the manner proposed. The device makes no pretense at astronomical exactness, being solely an aid to the imagination in explaining otherwise abstruse Biblical verses. Situated at the so-called corners are blocks 7 which are held in place by bolts 8 (Fig. 4) upon which the blocks may be swung on the arc of a circle in order to effect adjustments of a cord or cable 9 that drives a pulley 10 on the shaft 11 of the respective sphere 6.

Plates 12 complete a bearing for the shaft 11, the lower end of the shaft entering a recess 13 in a foot 14 of the adjusting block. The nut 15 of the bolt 8 secures the plate 12, as well as the block 7, but upon loosening of the nut the former may be swung sufficiently to one side or the other to tighten the driving cord. This cord is trained around a large drive wheel 16 as well as the pulleys of all of the spheres. It is also trained around the pulley 17 (Fig. 6) on the shaft 18 of a crank 19 which is intended to be turned in order to set the device in motion. The pulley 17 is situated in the fork of a bracket 20 which is located upon an extra arm 21 of the framework 2.

A slot 22 in the outer end of that arm (Fig. 3) receives a bolt 23 which, together with a nut 24, secures the crank bracket in position. Loosening of the nut will permit the sliding of the bracket in reference to the slot so that an adjustment will be made. While each of the blocks 7 is adjustable in order to tighten or loosen the driving cord 9, it would ordinarily be preferable to make the desired adjustments at the crank bracket 20, although there may be instances in which adjustments may be made to better effect at one or more of the blocks 7.

The large drive wheel 16 comprises a hub plate 25 from which a number of spokes 26 radiate. It is to the spokes at points where they join the rim of the wheel that segments 27 are attached. These segments carry the names of the months of the year as shown in Figure 1. They also abut the rim that is attached to the outer extremities of the spokes and constitutes a part of the drive wheel. The relationship of the months to any one or all of the spheres may be made the subject of a discussion. The segments may be composed either of thin wood or cardboard, and may be secured by tacking the ends to the spokes.

A stud 28, affixed to the framework 2 (Fig. 3), and passing through the hub plate 25 provides the axis upon which the drive wheel will revolve. A ring 29 reinforces the spokes because the latter are merely brought together at a common meeting point around the stud. Any simple mode of securing the spokes to the plate 25 may be employed. A holder 30, either attached to one of the spokes or at any desired point on the ring 29, serves the purpose of supporting a candle 31 or some other suitable luminary. The candle is designed to represent the sun, and by the use of it the illumination of any earth sphere 6 can be illustrated.

The operation is readily understood. The turning of the drive pulley 17 by the crank 19 will cause simultaneous revolution of the spheres 6 and of the drive wheel 16, the rate of turning of the former being greater than that of the latter. In practice the spheres may be made to appear as globes so that the light from the candle 31 may be made to simulate the appearance of day and night on the globes.

In explaining the device, the base 1 may be pointed out as the foundation of certain members of the celestial system. The relative movement of the months of the year may be explained as the passage of time in respect to one of the spheres. Although the candle 31 is intended to represent the sun, and moves in an orbit in respect to each of the spheres, it may be explained that the relationship of any one of the spheres is constantly changing in respect to the sun, so that the latter is relatively near the earth at one point in its travel, and relatively remote at another point.

While the construction and arrangement of the improved demonstration device is that of a generally preferred form, obviously modifications and changes may be made without departing from the spirit of the invention or the scope of the claims.

I claim:—

1. A device of the character described comprising a framework, a plurality of spheres journaled upon the framework, a wheel revoluble upon the framework, a luminary carried off-center by the wheel, and means for driving the wheel and spheres in unison so that the luminary travels on a prescribed orbit in respect to the spheres.

2. A device of the character described comprising a framework including crossed pieces, spheres journaled upon the crossed pieces and including pulleys, a wheel revoluble upon the framework, a luminary mounted off-center upon the wheel, a bracket, a shaft journaled upon the bracket having a crank and a drive pulley, a drive cord applied to the rim of the wheel, the drive pulley and the pulleys of the spheres to cause simultaneous turning when the crank is operated, and an arm included in the framework upon which the bracket is adjustable to effect adjustments of the drive cord.

3. A device of the character described comprising a framework which includes crossed pieces and an extra arm which has a slot, spheres journaled upon the crossed pieces, each including a pulley, a drive wheel journaled on the framework including a rim, a drive shaft having a crank and a pulley, a drive cord applied to said pulley, the rim of the wheel and to the pulleys of the spheres causing simultaneous turning when the crank is operated, a bracket having a forked end in which the shaft is journaled and between the forks of which the drive pulley is situated, and means securing the bracket to said arm at the slot, being capable of adjustment in the slot to shift the position of the bracket and regulate the tension of the drive cord.

4. A device of the character described comprising a framework having a stud, a revoluble wheel comprising a hub plate through which the stud passes, a plurality of spokes assembled upon and radiating from the hub plate, a rim attached to the outer extremity of the spokes, a ring applied to the spokes adjacent to the hub plate to reinforce the former and constituting a wheel within said revoluble wheel, a luminary holder applicable to any one of the spokes or to the ring, and means for turning the wheel upon the stud.

CHARLIE X GANT.
his
mark